(12) United States Patent
Reinhard (10) Patent No.: US 6,224,015 B1
(45) Date of Patent: May 1, 2001

(54) AERIAL CABLEWAY LEADING TO AN AEROSTATIC AIRBORNE BODY

(75) Inventor: Andreas Reinhard, Zollikon (CH)

(73) Assignee: Prospective Concepts AG, Zollikon (CH)

( * ) Notice: Subject to any disclaimer, the term of this patent is extended or adjusted under 35 U.S.C. 154(b) by 0 days.

(21) Appl. No.: 09/341,042

(22) PCT Filed: Feb. 12, 1998

(86) PCT No.: PCT/CH98/00053

§ 371 Date: Jun. 30, 1999

§ 102(e) Date: Jun. 30, 1999

(87) PCT Pub. No.: WO98/34823

PCT Pub. Date: Aug. 13, 1998

(30) Foreign Application Priority Data

Jun. 11, 1997 (CH) .................................... 1408/97

(51) Int. Cl.⁷ ........................................ B64B 1/00
(52) U.S. Cl. ................................. 244/24; 244/30
(58) Field of Search ............................ 244/24, 30, 31, 244/32, 33, 115

(56) References Cited

U.S. PATENT DOCUMENTS 3,834,655 * 9/1974 Crosby, Jr. .......................... 244/33 X
4,842,221 * 6/1989 Beach et al. ........................ 244/33 X
6,010,093 * 1/2000 Paulson .................................. 244/24

* cited by examiner

Primary Examiner—Robert P. Swiatek
(74) Attorney, Agent, or Firm—Jenkens & Gilchrist, P.C.

(57) ABSTRACT

The cableway consists of a captive balloon (1) carrying a gondola (2) to which two transport cables (3, 4) and a mooring cable (5) are attached. The two transport cables (3, 4) bearing a cabin (10, 11) for carrying passengers end at a ground station (7) which is rotatable on a circular rail (9) around a vertical axis (8). The transport cables (3, 4), both in the gondola (2) and in the ground station, run on and off drums. The ground station (7) can be actively tracked with reference to the site of the captive balloon (1).

The mooring cable (5), secured to the gondola (2), runs on a drum in the ground station (7) and is equipped with beacons (13). The captive balloon (1) can be released to any desired height, the unused length of the transport cables (3, 4) remaining on the drums in the ground station (7).

The cabins (10, 11) are coupled in shuttle operation or move separately driven by motors provided in the gondola (2).

26 Claims, 7 Drawing Sheets

AERIAL CABLEWAY LEADING TO AN AEROSTATIC AIRBORNE BODY

BACKGROUND OF THE INVENTION

1. Field of the Invention

The invention relates to a system for transporting passengers and goods on a cableway between the ground and an aerostatic buoyancy body.

2. History of Related Art

Similar transport channels, though only for transporting goods, are known e.g. from SU 18 087 65 A1 and in a somewhat extended sense also from SU 58 60 22. Passenger and goods cableways are also known per se.

In the case of the cableways known from the citations, the main purpose is to transport heavy goods such as tree-trunks, building material or the like substantially horizontally in areas where no runways, railways or similar structures can or may be constructed. The solutions found may therefore be adequate to solve the problems posed. In the known devices the aerostatic buoyancy body also serves as a support or a suspension tower but not as a cableway station.

Cableway construction between two stationary sites for transport of passengers and goods is a highly-developed branch of the art. In the art of captive aerostats for monitoring space by electronic means, there are known structures and devices for anchoring, lowering and drawing in captive balloons of the kind in question, e.g. in the pamphlet "71 M™ Aerostat" published by Messrs TCOM, L.P., Columbia, Md., USA.

However, when constructing a cableway to an aerostatic buoyancy body, problems occur which cannot be solved by transferring known solutions from the sector of terrestrial cableway construction to the special features of the art of captive balloons. The term "captive balloon" here and hereinafter will basically stand for an aerostatic buoyancy body which is anchored to ground by a line and can also comprise components of an aerodynamic buoyancy means.

The problem in the present case is to construct a cableway between the ground and a captive balloon so as to allow for the limited carrying capacity of aerostats and for all the relevant safety aspects. Another aim is to transport groups of passengers quickly and provide them with a safe stopping place on a platform carried by a captive balloon.

The solution of the posed problem, as regards its main features and other advantageous features are disclosed in the claims.

BRIEF DESCRIPTION OF THE DRAWINGS

The invention will be explained in further detail with reference to the accompanying drawings, in which.

DETAILED DESCRIPTION OF THE PREFERRED EMBODIMENTS

Figure 1:
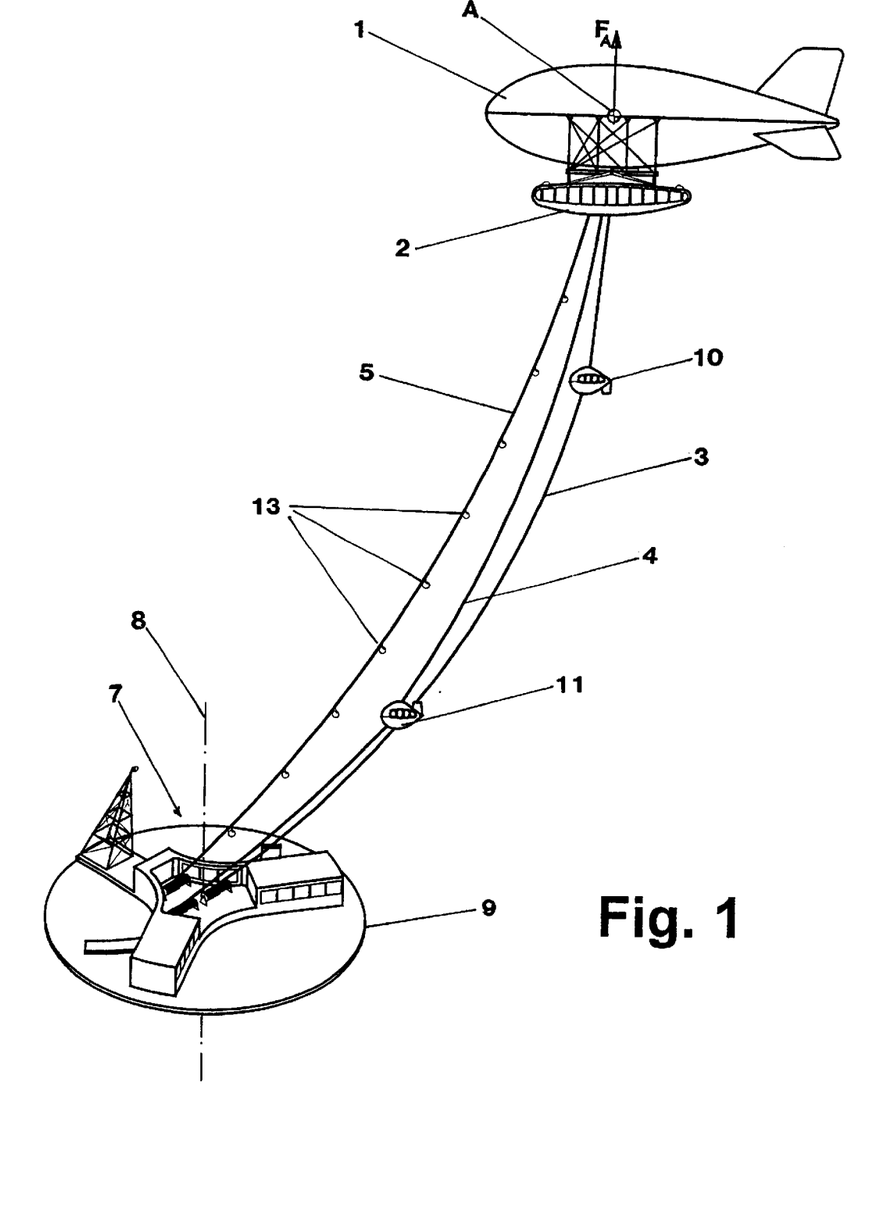
FIG. 1 is a diagrammatic general view of a first exemplified embodiment.

FIG. 1 is a very simplified view of a cableway according to the invention in a first embodiment. A captive balloon 1 carries a gondola 2 to which three cables are attached, two transport cables 3, 4 and a mooring cable 5. The two transport cables 3, 4 end at a ground station 7 which is rotatable around a vertical axis 8 and can rotate on a circular rail 9. Each transport cable 3, 4 bears a cabin 10, 11 for carrying passengers. Although details are referred to in subsequent drawings, the basic features can be explained with reference to FIG. 1. The transport cables 3, 4, both in the gondola 2 and in the ground station, run on and off drums.

The ground station 7, which will be described in further detail with reference to FIG. 2, can be actively tracked with reference to the prevailing wind direction or the site of the captive balloon 1, with the result that the ground station 7 is always to windward of the captive balloon 1 and the cables 3, 4, 5 extend to leeward.

The mooring cable 5 is secured to the gondola 2 at a suitable place and runs on a drum 19 in the ground station 7. The captive balloon 1 can therefore be released to any desired height, whereas the unused length of the transport cables 3, 4 remains on drums 17, 18 in the ground station 7.

Basically, the cabins 10, 11 are coupled in shuttle operation, driven by the traction motors provided in the gondola 2. For safety reasons, however, the coupling can be disconnected, so that the two cabins 10, 11 can move downwards separately. In the ground station 7 the transport cables 3, 4 are wound up at the same speed as they are unwound in the gondola 2 and vice versa; however the motors driving the cable drums in the ground station 7 are used only for slowing down the cables 3, 4 when paid out and for compensating the length of the cables when drawn in, whereas the actual traction motors are in the gondola 2 as already described. The mooring cable 5, like the transport cables 3, 4, is preferably made of aramid fibres or synthetic fibres of similar quality. It has an "umbilical" construction, wherein the core of the mooring cable 5 contains lines for conveying energy and for transmitting information between the gondola 2 and the ground station 7, surrounded by a jacket made of the said materials and receiving the tensile forces, and suitable electric earth wires.

In an advantageous embodiment the captive balloon 1 has photovoltaic cells 45, so that the plant, even at night, can be operated with neutral energy. In addition to the individual conventional captive balloon 1 shown in FIG. 1, embodiments with two or three such captive balloons are included in the inventive idea, or embodiments comprising different shapes of balloon or a number of balloons. Likewise the invention includes buoyancy bodys with dynamic buoyancy in addition to aerostatic members.

The invention also includes equipping the mooring cable 5 with beacons 13 which are illuminated at least at night and comprise passive reflectors or transponders for radar signals, to meet the requirements of safety in flight and reliability of the balloon cableway.

Figure 2:
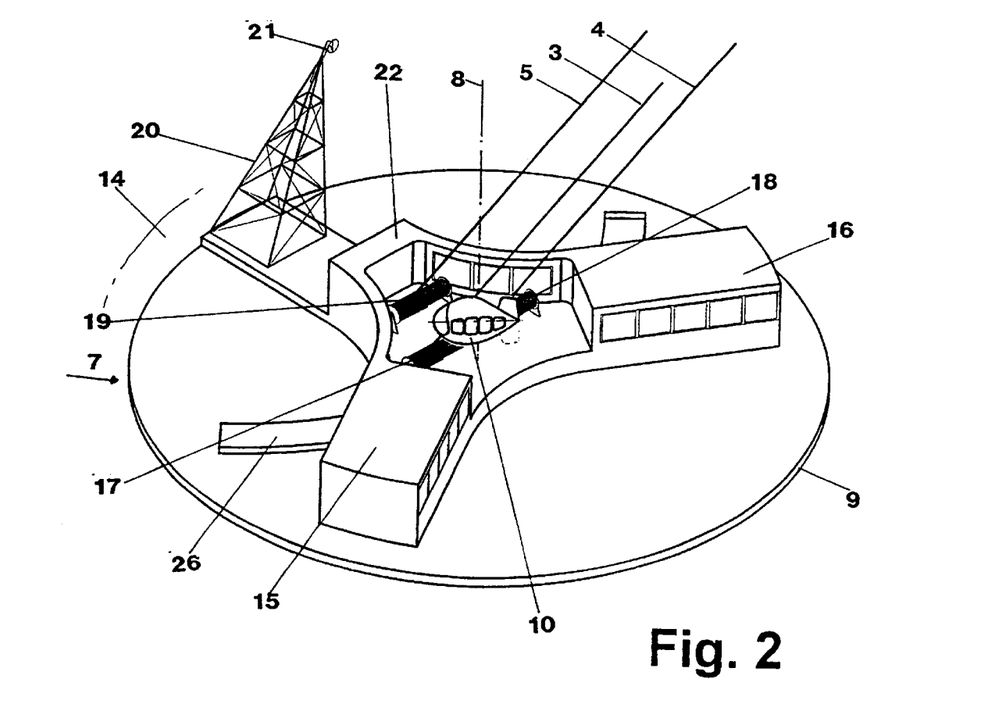
FIG. 2 is a slanting top view of the ground station.

FIG. 2 is a detailed representation of the ground station 7. A circular, single or double rail 9 is e.g. surrounded by an annular road 14 giving access to two waiting rooms 15, 16. The waiting rooms 15, 16 are entry and exit bays for cabins 10, 11 respectively. In the present case, cabin 10 is on the ground. The drawing also shows the three cable drums 17, 18, 19, one for each cable 3, 4, 5. It does not show motors, transmissions and other known equipment, for operating the cable drums 17, 18, 19 or for rotting the entire ground station. The axis 8 extends approximately through the middle of the arrangement of the three cable drums 17, 18, 19. A tower 20 with a device 21 for receiving the captive balloon 1 is disposed at the windward end of the ground station 7. The diameter of the rail 9 is about equal to the length of the captive balloon 1, so that when moored, the balloon does not take up more space than the entire installation in the operating state.

The positioning of the cable drum 17, 18, 19 towards the middle of the ground station 7, with each waiting room 15, 16 at the periphery, is not per se essential to the invention. Alternatively the cable drums 17, 18 can be on the periphery and the two waiting rooms 15, 16 can be at the centre or if necessary combined in a single group.

The ground station 7 also contains control rooms 22 for machinery and administration.

The ground station is actively tracked by determining the position of the gondola 2 and forming the difference from the position of the ground station 7. The position can be determined either via an inertial platform or GPS location on the gondola 2. Data are transmitted by the data line in the captive part 5 or by radio, and the same applies to synchronisation of the cable speeds in the gondola 2 and the ground station 7. These and other tasks are performed by a computer (not shown) in the control rooms 22, exchanging data with a computer (likewise not shown) in the gondola 2.

Figure 3:
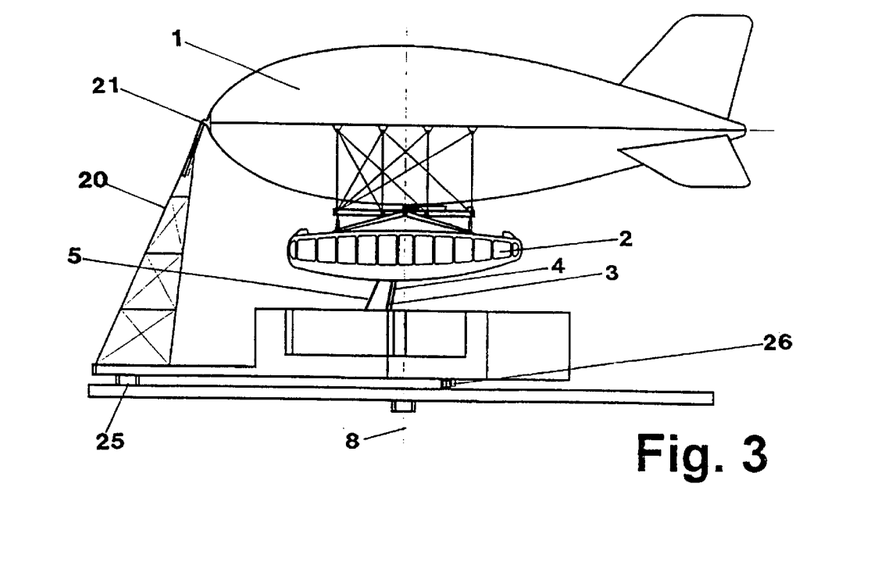
FIG. 3 is a side view of the captive balloon anchored in the ground station.
Figure 5:
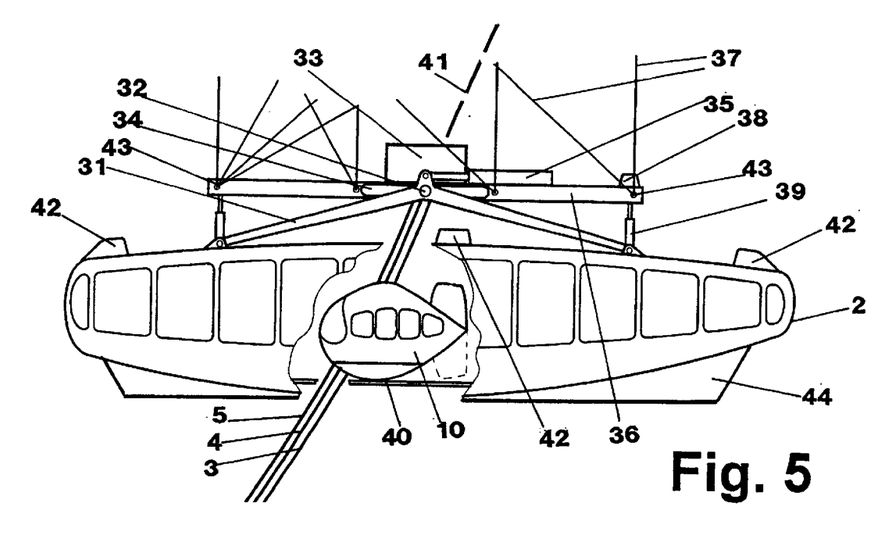
FIG. 5 is a side view of the balloon gondola.

FIG. 3 shows the captive balloon 1 and gondola 2, as described in FIG. 5, moored to the tower 20. As before, the vertical forces due to buoyancy are taken by the mooring cable 15. Horizontal forces due to wind are taken by the tower 20, provided the captive balloon 1 is exactly to windward. Since the position of a moored captive balloon substantially coincides with the position of the ground station 7, the said difference formation between positions is not suitable in this case for tracking the ground station 7.

Figure 4:
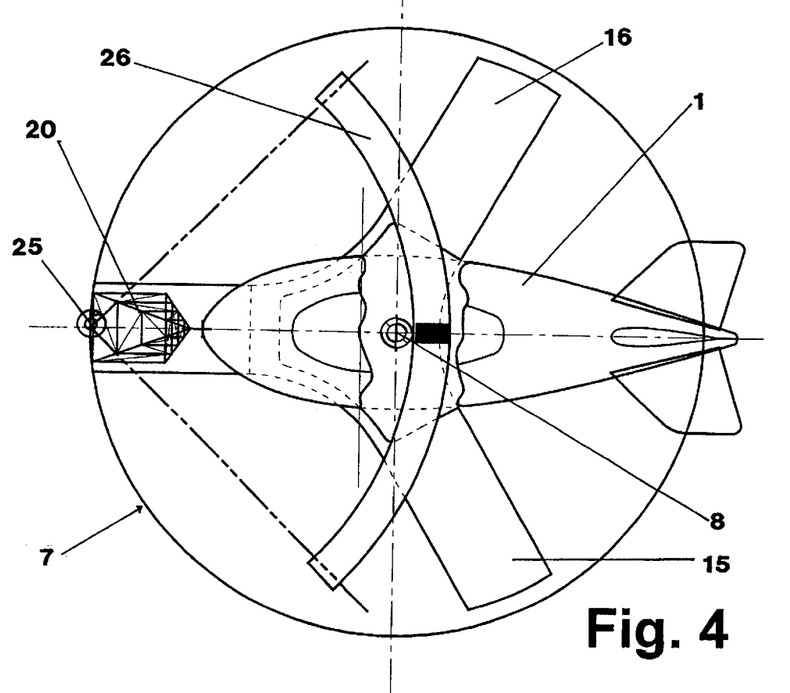
FIG. 4 is a plan view of FIG. 3.

For this purpose, the following components are provided: The entire ground station 7, which can rotate around the axis 8 when the cableway is in operation, is made pivotable around an axis 25 extending through the tower 20. All the engineering equipment of the ground station 7, such as waiting rooms 15, 16, cable drums 17, 18, 19 and control rooms 22, rotates on an additional rail 26 in the form of a circular sector. The radius of the rail depends on the weight and the centre of gravity of the ground station 7 and is approximately equal to the radius of the circular first rail 9. FIG. 4 shows the ground plan thereof.

If the captive balloon 1 is moored and in a side wind, the entire ground station 7, under the influence of the wind forces, preferably rotates around the axis 25 on the second rail 26. This motion is detected by sensors in the region of the ground station 7 and is processed by the computer in the control rooms 22, which actuates the motors for rotating the entire ground station 7 on the first rail 9 until the captive balloon 1 is again moored in the ground station 7 in a symmetrical position and subject to symmetrical forces. The said sensors, based on ultrasound, infrared or measurement of force, are known and installation thereof is prior art. Consequently neither sensors or motors are shown. The procedure described avoids large lateral wind forces and also ensures that the ground station 7 has to be tracked only occasionally, i.e. when the captive balloon 1 goes outside a defined limiting position.

One embodiment (not illustrated) of the ground station 7 is in the form of a moored floating member. If the floating member is moored by a chain or rope to the bottom of the water, there will be no need for pivoting or tracking devices. The captive balloon 1 and the ground station 7 will then swing round the point of anchorage to the bottom of the water. Of course, the floating member can be a seaworthy ship and if required can be actively guided in accordance with the direction of the prevailing wind.

No especial mention is made of the devices and precautions generally known in the art of cableways.

Figure 6:
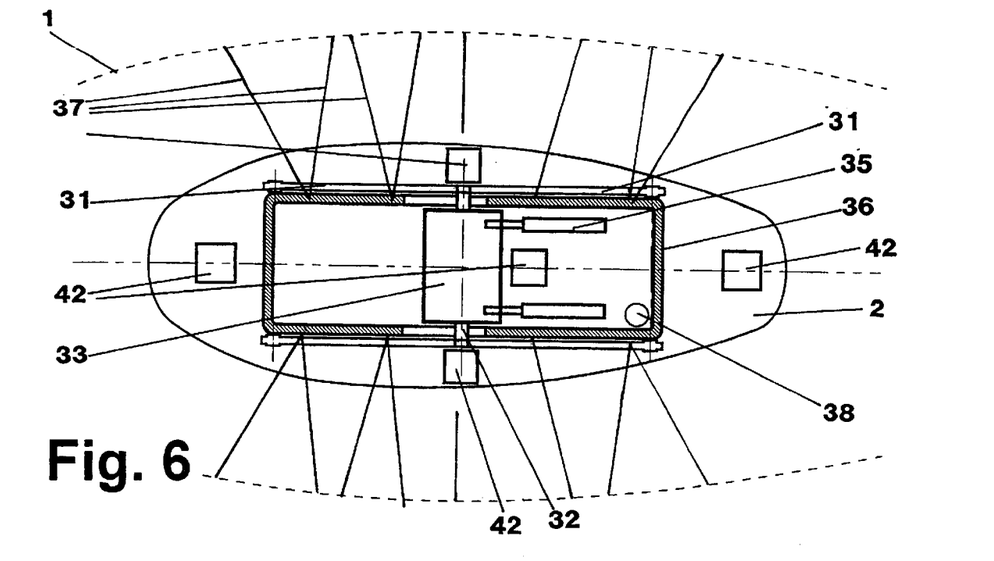
FIG. 6 is a plan view of the gondola.

FIG. 5 shows the gondola 2. It is suspended from a continuous shaft 32 via four suspension components 31 (only two of which are visible). All the drive devices and securing means for the captive cable 5, shown in simplified form, are contained in a casing 33, so that the tensile forces originating from the cables 3, 4, 5 can be received without torque by the shaft 32. The shaft, together with the casing 33, is movable on horizontal rails 34 e.g. by hydraulic means, and accordingly a hydraulic cylinder 35 is shown. The rail 34 and the casing 33 are supported by a frame 36 secured by ropes 37 to the captive balloon 1, as also shown in FIG. 6. The shaft 32 can be moved so as to guide the line of action (marked 41 in FIG. 3) of the cable forces through the centre of buoyancy of the captive balloon, so that positive or negative restoring moments on the captive balloon can be immediately compensated under computer control. To this end the frame 36 is equipped with a diagrammatically indicated clinometer 38. The gondola 2, which is suspended from and swings under the frame 36, has shock-absorbers 39, which can either be passive in the form of vibration absorbers or active in the form of hydraulic cylinders. These can absorb swings of the gondola 2 or actively keep it horizontal.

In its central region the gondola 2, which is e.g. round or oval in cross-section, has openings for the cables 3, 4, 5 and for the entrance and exit from the cabins 10, 11. To enable passengers to enter and leave, the opening under the cabin when retracted (cabin 10 in FIG. 3) can be closed by a foldable or insertable floor 40.

FIG. 6 is a top view of the frame 36 and gondola 2. All components in this drawing have already been introduced and explained with reference to FIG. 5.

In an installation according to the invention and described here, there are risks to the safety of persons and things. The risks can be classified as follows:

a) The captive balloon 1 loses gas.

b) The captive balloon 1 is completely torn open by external action.

c) The mooring cable 5 breaks.

d) One of the transport cables 3, 4 breaks either over cabin 10 or 11, or under cabin 10 or 11.

These safety risks are eliminated according to the invention by the following constructions.

a) In view of the large volume of gas, of the order of 10,000 to 40,000 m$^3$, and an excess pressure in the range from 500 Pa to 1,000 Pa the loss of buoyancy per unit time, even in the case of fist-size holes, is so small that if a loss of gas of this kind is detected the captive balloon can be hauled in by the normal procedure.

b) In view of the existing technology for captive balloons, a sudden loss of gas is conceivable only as a result of deliberate destructive external action. Even in this case, however, methods are provided for a safe return of the gondola 2 to ground. In FIGS. 3 and 4, box-like components 42 are mounted on the gondola 2. These each contain a parachute with a release device. In the assumed case of a substantial loss of buoyancy forces, as measured by a dynamometer at the suspension points 43 of the frame 36, the computer on the gondola 2 will activate the mechanisms for releasing the parachutes. Depending on the size and weight of the gondola 2, cabins 10, 11 and cables 3, 4, 5, four to eight cargo parachutes of standard diameter 100 feet (approx. 30 m) are provided, enabling the load to descend at a maximum rate of about 7 to 8 m/sec. If, in case b), one of the cabins 10, 11 is in the gondola 2, it will remain there and glide therewith to ground on the said parachutes. Suspension, connection and release of such combined cargo parachutes is prior art and need not be further explained here. Also, in the safety system according to the invention, the gondola 2 suspended from parachutes floats downwards on cables hauled in from the ground station 7 and remains to leeward of the ground station, i.e. is hauled against the wind, which enables the hauling process to be efficiently controlled. This does not place any special requirements on the drives of the cable drums 17, 18, since during normal operation the transport speed of the cabins 10, 11 is about 10 to 15 m/sec, compared with a provided rate of descent of the gondola 2 in an emergency of about 7–8 m/sec as stated. In order to cushion the impact on the ground, the gondola 2 has a collapsible zone 44 e.g. in the form of an air bag, diagrammatically shown in FIG. 3. Honeycomb structures or pneumatic spring legs are other possible collapsible zones according to the invention.

c) If the mooring cable 5 breaks the gondola 2 will still be anchored to the two transport cables 3 and 4, which are dimensioned to bear the additional stress by themselves. In this emergency, however, both the energy and the data connection by wire or glass fibre will fail, and consequently the following precautions must be taken:

self-sufficiency in energy, as described with reference to FIG. 7, and a redundant data connection is provided by radio.

Since there is no pressure of time in an emergency of this kind, the hauling-in process can be interrupted when one of the cabins 10, 11 enters the ground station 7. Either the cabin can be disconnected from the corresponding transport cable 3, 4 or the balloon-side part of the transport cable can be hauled into the gondola 2.

d) If the balloon-side part of one of the transport cables 3, 4 breaks, this emergency will be dealt with by the means described with reference to FIG. 8. If the break is in that part of a transport cable 3, 4 which connects the corresponding cabin 10, 11 to the ground station 7, the cabin 10, 11 can either be pulled into the gondola 2 or can be left on the ground, depending on which solution is safer in view of the position of the cabin 10, 11 in question between the ground and the captive balloon 1.

Figure 7:
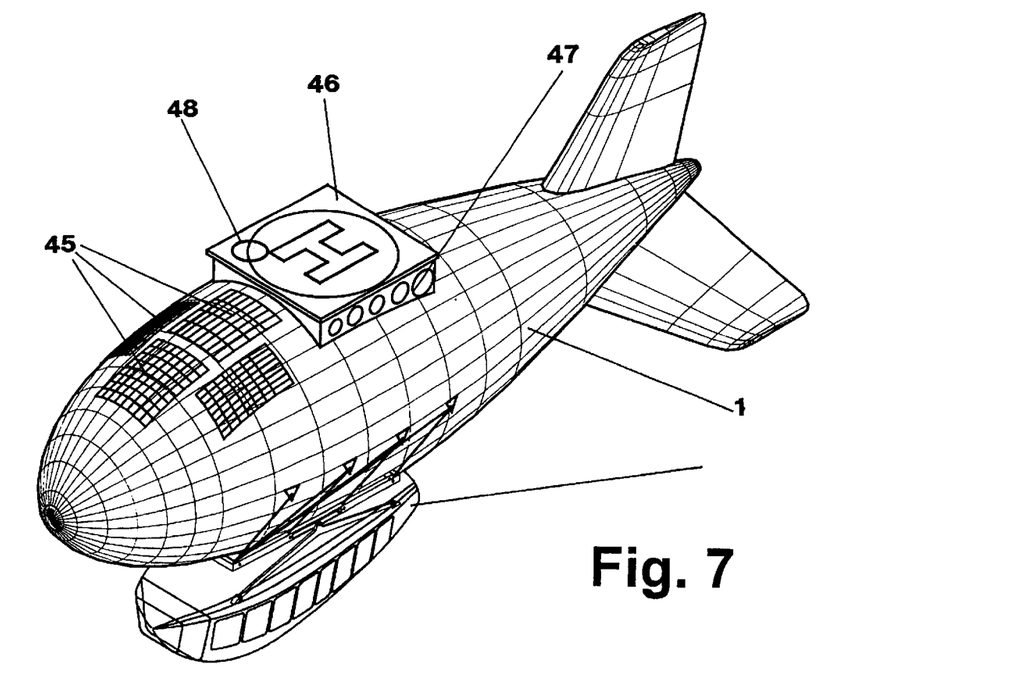
FIG. 7 is a slanting top view of the captive balloon.

FIG. 7 is a perspective view of the captive balloon 1 from above, with some components which have hitherto not been described or not in detail. On the one hand the balloon carries a number of photovoltaic cells 45, which are given an area such that the energy required by the airborne part of the installation can be covered at least during the day. If in a sample calculation it is assumed that on the one hand the cabins 10, 11 are in shuttle operation and are mechanically coupled and under the same load, so that in this case only the loss by friction needs to be compensated, amounting to about 10%, if a cabin weighs 800 kg and rises vertically at 15 m/sec, a power of 120 kW is necessary in order to raise a cabin (without shuttle operation), consequently the loss through friction is about 12 kW, and about 10–15 kW are required for lighting, auxiliary equipment and controls, a total power of about 30 kW will be appropriate. If the photovoltaic cells 45 are assumed to have an efficiency of 10% (relative to the solar constant), about 300 m$^3$ of solar cells 45 will be necessary. Compared with the approximately 3,500 m$^2$ surface area of a captive balloon 1, this is only a small part of the total surface, and can also be increased without difficulty to obtain a more reliable supply. The captive balloon 1 can also carry a helicopter landing platform 46, e.g. on a pneumatic pad 47, closed by a hatch 48. If the captive balloon 1 is at an excess pressure of e.g. about 750 Pa, it will withstand a load of 750 N/m$^3$ without buckling, so that a landing platform measuring about 150 m$^2$ will have a gross carrying power of about 112 kN. Of course, the landing weight of a helicopter is limited not only by the aerostatic load-bearing power of the balloon shell, but also and at least equally by the net buoyancy of the captive balloon 1. Furthermore when a helicopter lands the relative position of the centre of gravity and the centre of buoyancy are altered, and consequently the restoring moment of the captive balloon 1 and the gondola 2 is affected. This also limits the maximum weight of a helicopter.

Figure 8:
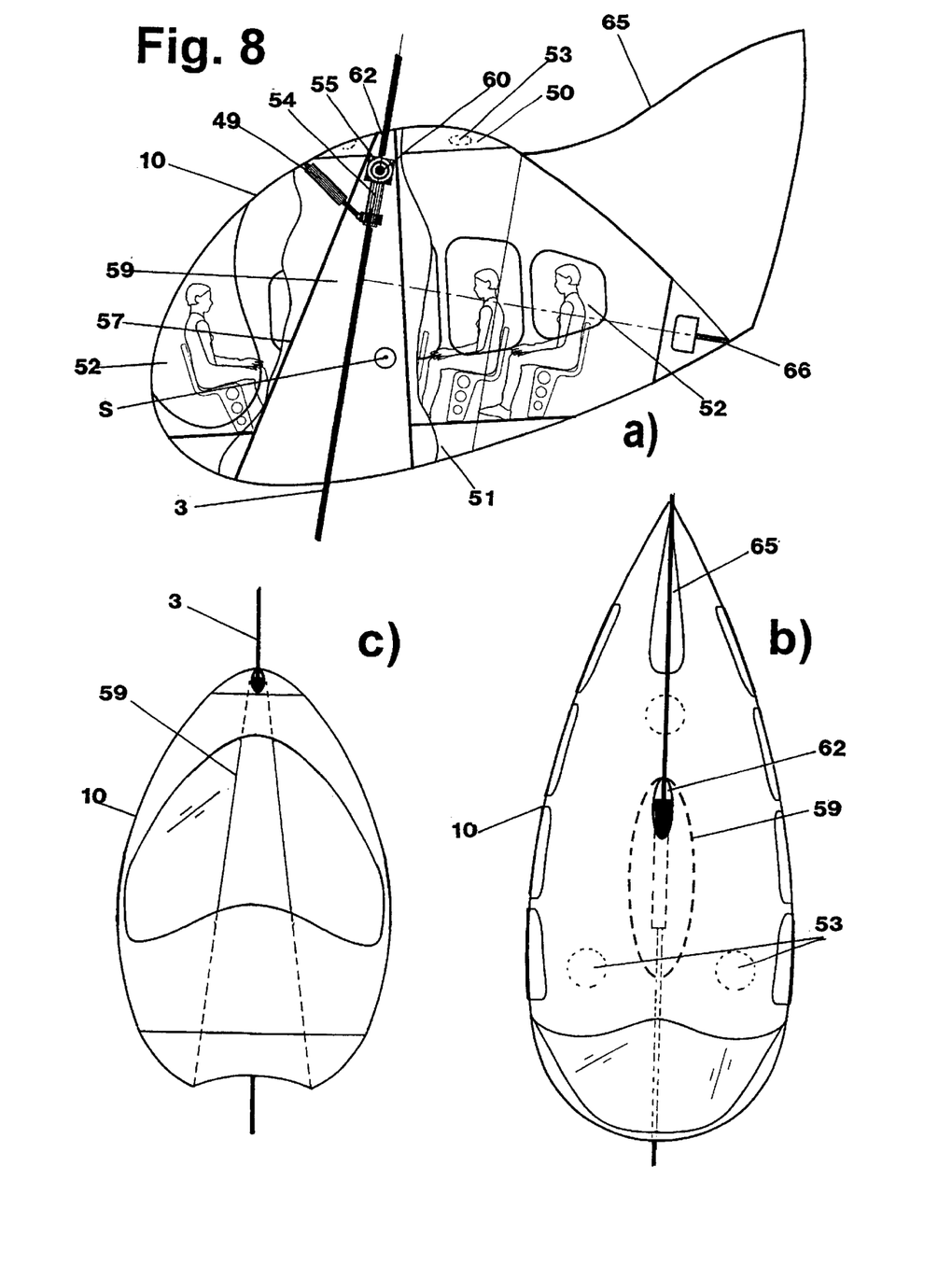
FIG. 8a is a side view of a cabin, partly in section.
FIG. 8b is a plan view of a cabin.
FIG. 8c is a front view of a cabin.

FIG. 8 shows an embodiment of the cabin 10; FIG. 8*a* is a side view, partly in section, FIG. 8*b* is a plan view, partly in section, and FIG. 8*c* is a front view.

The cabin 10 has an aerodynamic profile, both to reduce the wind resistance and always to keep the cabin 10 to windward. The prevailing wind also includes the relative wind. The wind vector therefore always has an appreciable vertical component. For improved stabilisation against the total wind, the cabin 10 carries a stabilising fin 65 which can be swung around an approximately horizontal axis 66. The fin 65 is bent downwards when the cabin 10 rises and upwards when the cabin descends, as shown in FIG. 8*a*.

In the interior the cabin 10 has a conical shaft 59, the opening angle of which includes all inclinations of the transport cable 3 which occur in practice. The wall 57 of the shaft 59 is e.g. the load-bearing construction for the cabin 10, to which all other components are directly or indirectly fastened. The transport cable runs through the shaft 59 and is tightly clamped in a sleeve 54 The sleeve, e.g. at its top end, is connected by a universal suspension 55, supported by a shaft 60. The universal suspension 55 enables the cabin 10 to swing in any vertical plane.

Such swinging motion is absorbed by a diagrammatically-indicated shock-absorber 49. A second shock-absorber at right angles to the shock-absorber 49 and to the plane of the drawing, is also provided but is omitted for clarity in the drawings.

The axis 60 is in the vertical line of action of the centre of gravity S of the cabin 10. The cabin 10 has external windows 52. Over the glazed part, the cabin 10 has a hood 50 which extends over the shaft 59 and has an opening 62 for the transport cable 3. The hood 50 also covers a number (three in the present case) of containers 53 holding parachutes, on which the cabin 10 can float downwards if the transport cable 3 breaks above the cabin 10. A cable break of this kind will be detected e.g. by a dynamometer along the axis 60. Alternatively the containers 53 can be disposed underneath the passenger space.

Figure 9:
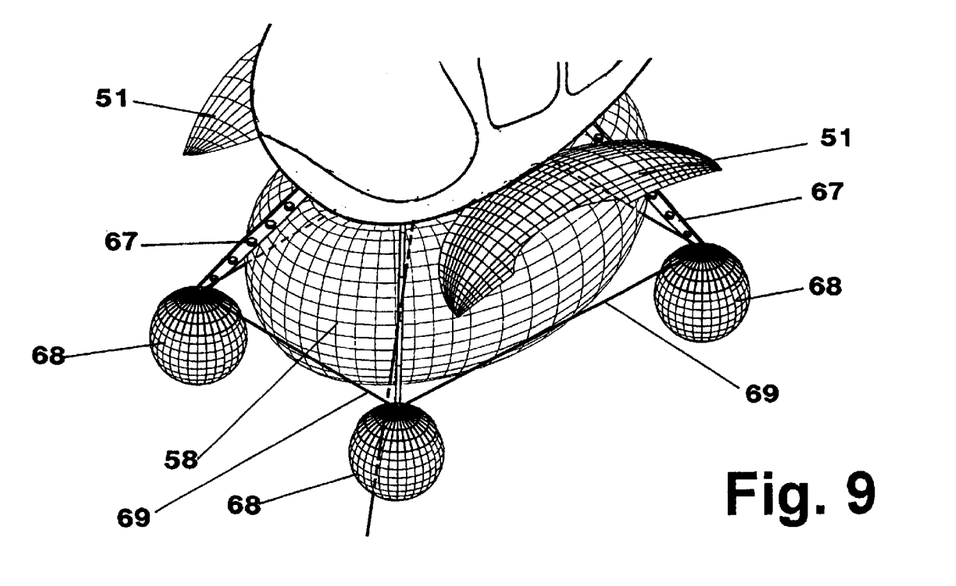
FIG. 9 is a perspective view of a cabin with extended life-saving devices.

Underneath the glazed part 52, the cabin has a floor cap 51 in which a collapsible zone 58, e.g. in the form of an air bag, is fastened. In addition, four legs 67 for example can be swung out after being simultaneously triggered, like the parachutes in the containers 53. Each leg can have an air bag-like pneumatic shock-absorption member 68 and can be connected to the other legs e.g. by a cable 69, as shown in FIG. 9. Also, safety can be increased and weight can be saved by providing seating facilities, which additionally absorb the shock of an emergency descent on parachutes.

The drawings omit obvious features such as telecommunication equipment, computers, emergency aid equipment, energy accumulators and the like.

The cabin can be shaped to ensure that even in a complete calm, the cabin 10 is to windward and does not begin to rotate around the transport cable. Of course any twisting of the transport cables 3, 4 is carefully eliminated before starting.

Any slope of the cabin 10 through an asymmetrical distribution of weight can be counteracted, at least in the sagittal plane, if either the axis 60 of the universal suspension 55 is movable or if an electric energy accumulator, which is provided in any case for operating the on-board and the safety equipment, can be moved in the sagittal plane. Of course the two precautions can be combined to obtain an optimum trimming device.

Figure 10:
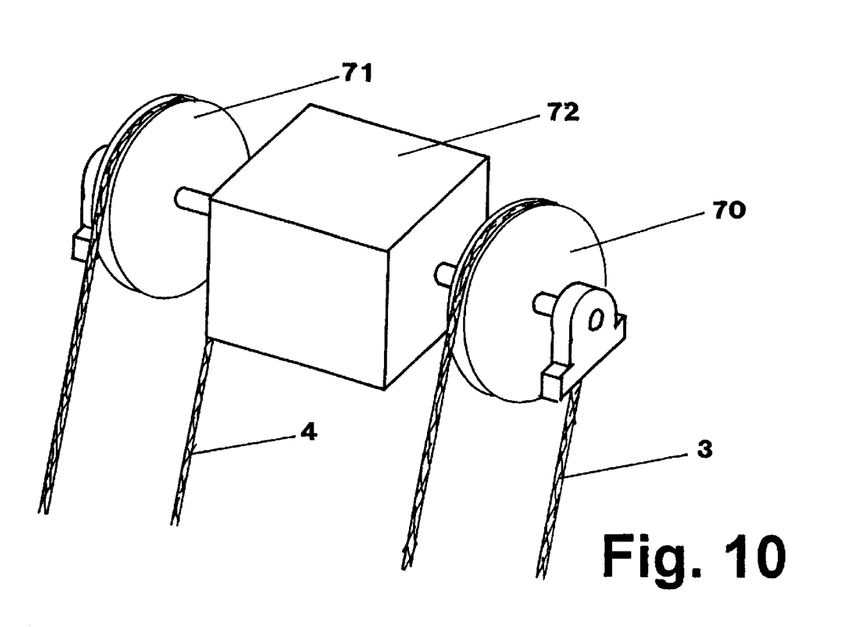
FIG. 10 shows a detail of the cable guidance.

In another embodiment of the invention, which is only partly illustrated by drawings since the main features of the invention have already been described, the transport cables 3, 4 in the gondola 2 each run round a pulley 70, 71 as shown in FIG. 10. The two pulleys 70, 71 are coupled and usually run in opposite directions; the coupling can be e.g. mechanical, hydraulic or electric. The coupling means are diagrammatically shown as a box 72 in FIG. 10 and are known per se. In this embodiment each transport cable 3, 4 extends from the ground station 7 to the corresponding pulley 70, 71 and back to the ground station 7 and is driven by a traction motor in the ground station 7. The two traction motors can also be coupled. The means for coupling the cable motion, both in the gondola 2 and in the ground station 7, can also be used to break the coupling, so that the two cabins 10, 11 can descend separately.

Figure 11:
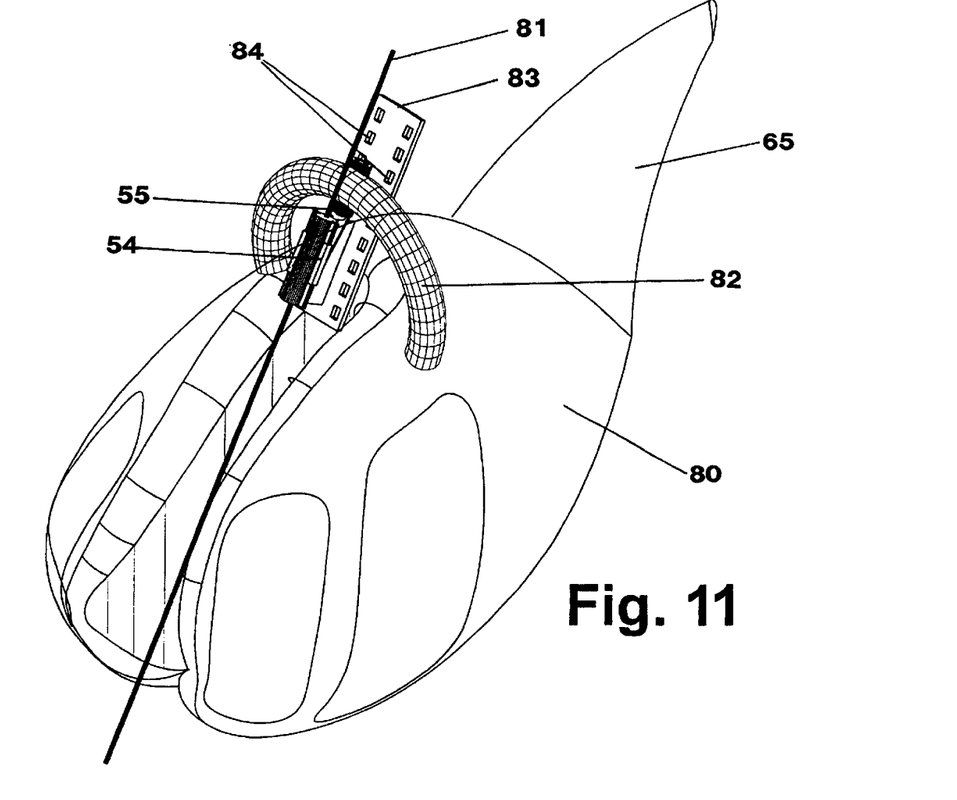
FIG. 11 is a perspective view of an additional embodiment of a gondola.
Figure 12:
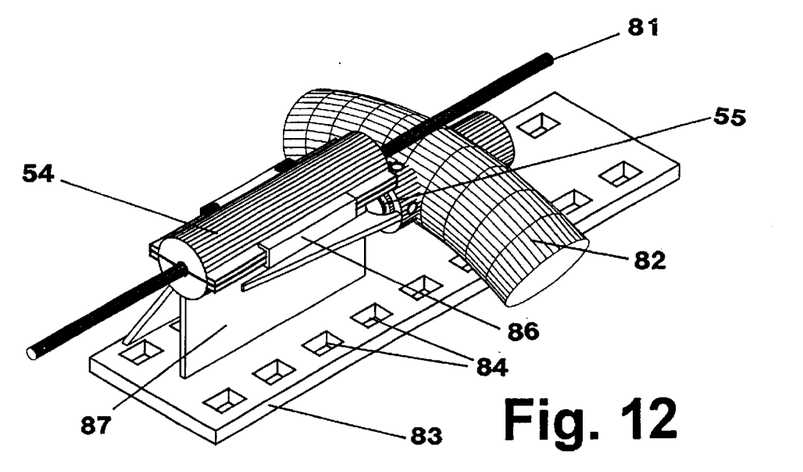
FIG. 12 shows a detail of the suspension device.

The invention also includes a third embodiment, using a number of cabins 80 instead of two single cabins 10, 11. The number is restricted by the carrying power of a single endless rotating transport cable 81 and by the buoyancy of the captive balloon 1. The transport cable 81 is therefore technically equivalent to the combined transport cables 3, 4, though this does not exhaust the process of manufacturing the transport cable 81. FIG. 11 shows one of the cabins 80 and FIG. 12 shows a detail of the means fastening the cabin 80 to the transport cable 81.

The cabin 80 in FIG. 11 has a substantially horseshoe-shaped cross-section, aerodynamically modified. The transport cable 81 runs between the two parts of the cabin 80 and also completely outside it. Modifications are also made to the sleeve 54 and the universal suspension 55, as shown in FIG. 12. The universal suspension 55 supports the cabin 80 on a holder 82. A plate 83 fastened to the sleeve 54 has regular-spaced perforations 84 which are adapted to receive hooks which can take the weight of the cabin 80 in the gondola 2.

The modified suspension of the cabin 80 comprises the sleeve 54, which here is longitudinally divided and provided with a locking means 86. On the side remote from the observer, the sleeve 54 has e.g. hinge joints, so that after the lock 86 has been opened the upper part of the sleeve 54 can be swung open.

The sleeve 54 is mounted on a supporting construction 87 which carries the plate 83 underneath so that in the front, in the direction of the cable, it carries the universal suspension 55 to which the cabin 80 on the holder 82 is fastened.

If the cabin 80 on the cable 81 moves upwards and reaches the gondola 2, a chain equipped with the said hooks engage in the perforations 84 in the plate 83. Initially the chain moves at the same speed as the transport cable 81. As soon as the hook engages, the lock 86 is released externally and the sleeve 54 is opened, thus freeing the cabin 80 from the transport cable 81.

The chain is then slowed down, as known in cableway technology, and the cabin 80 is transferred to a second cable, rotating slowly and horizontally in the gondola 2. The second chain slowly conveys the gondola 80 to the suitably-equipped transfer station on the transport cable 81, which is moving faster. An exit for passengers can likewise be provided in this embodiment. A number of cabins 80 can simultaneously be present in the gondola 2.

The transfer of cabin 80 from the transport cable 81 to the plate 83, which is in the gondola, on a transport system based on a chain or a belt, and is provided with a hook and perforations 84, is not in itself essential to the invention. Other solutions will be available to the cableway engineer. According to the invention, the sleeves 54 can be opened around the transport cable 81.

At the ground station 7, the cabins 80 are transferred to a stationary transport system completely similar to that in the gondola 2. The unused length of the transport cable 81 in the ground station runs into a cable storage means, so that the height of ascent is technically limited only upwards by the length of the transport cable, as is the case in all other embodiments described.

The transport cable 81, like the transport cables 3, 4 in FIG. 10, runs round a guide pulley in the gondola 2. The drive of the transport cable 81 can be either in the gondola 2 or in the ground station 7.

What is claimed is:

1. A system for transport of passengers and goods, said system comprising:

a ground station (7);

a gondola (2);

at least one aerostatic buoyancy body (1);

said at least one aerostatic buoyancy body (1) supporting said gondola (2);

a cableway extending between said ground station (7) and said gondola (2); and wherein the at least one aerostatic buoyancy body (1) is secured to the ground station (7) by a mooring cable (5) and the mooring cable in the ground station can be wound on and off a drum (19) and has a core which contains lines for conveying energy and exchanging information between the ground station (7) and the gondola (2) and is surrounded by a jacket of high-strength plastics material fibres and earth wires, at least two additional transport cables (3, 4) usually movable in opposite directions extend between the base station (7) and the gondola (2) and at least one cabin (10, 11, 80) is fastened to each cable, a substantially horizontal frame (36) is suspended on ropes (37) from the at least one aerostatic buoyancy body (1) and bears a shaft (32) which is disposed so as to be movable at right angles to the direction in which it extends and in turn supports the gondola (2) on suspension components (31), the at least two transport cables (3, 4) in the gondola (2) are received by a drive device which, together with the means fastening the mooring cable (5) are so fastened to the shaft (32) that the tensile forces exerted by them can be received without torque by the shaft (32), components (35) are provided for moving the shaft (32) parallel to its original position so that the line of action (41) of the tensile forces exerted by the at least three said cables (3, 4, 5) always extends through the centre of buoyancy of the at least one aerostatic buoyancy body (1), the gondola (2) comprises a computer for monitoring and controlling all mechanical processes, the ground station (7) is rotatable around a first vertical axis (8) relative to the environment, comprises mechanical means for winding on and winding off from cable drums, for rotating the ground station (7) in the direction in which the at least one aerostatic buoyancy body (1) is situated relative to the ground station (7), i.e. basically in the leeward direction, and also comprises a computer for monitoring and controlling all mechanical processes and connected for data transfer purposes to the computer in the gondola (2), and the ground station (7) also comprises means for anchoring an aerostatic buoyancy body (1) and means for continually rotating the anchored aerostatic buoyancy body (1) to windward, and both the gondola (2) and the cabins (10, 11, 80) comprise life-saving means which, in the event of a loss of buoyancy by the at least one aerostatic buoyancy body (1) and a breakage of at least one of the cables (3, 4, 5) ensure a safe return to the ground.

2. A system according to claim 1, wherein a single aerostatic buoyancy body is provided.

3. A system according to claim 1, wherein a respective transport cable (3, 4) is provided and fastened to a respective cabin (10 or 11), the two cabins (10, 11) usually move up and down in shuttle operation, each transport cable in the ground station(7) can be wound onto or off a respective cable drum (17, 18), each transport cable (3, 4) in the gondola (2) is wound on to or off a separate cable drum, and the cable drums are coupled by suitable means so that the rising transport cable (3 or 4) has the same speed as the descending transport cable (4 or 3), the transport cables (3, 4) are driven by traction motors in the gondola (2), the cable drums (17, 18) in the ground station (7) also have drive motors but these are only for computer-controlled compensation of the lengths of the transport cables, the cable speeds both in the gondola (2) and in the ground station (7) are monitored and measured by suitable means.

4. A system according to claim 3, wherein the ground station (7)

is mounted on a substantially circular platform which rotates on a circular rail (9) and is supported along the first vertical axis (8), the station comprises another cable drum (19) for the mooring cable (5), equipped with a drive motor for releasing the at least one aerostatic buoyancy body (1) and drawing it in against the net buoyancy forces, waiting rooms (15, 16) for departing and arriving passengers and control rooms (22) for the computer system for controls and drives and the engineering staff, the base station carries a tower (20) so disposed that it is substantially to windward of the base station (7), whereas all cables (3, 4, 5) extend to leeward, and the tower (20) bears a device (21) for receiving the nose of the at least one aerostatic buoyancy body (1), and on the circular platform the ground station bears an additional rail (26) in the form of a circular sector, the centre of rotation of the additional rail having an additional vertical axis (25) which extends through the tower (20), the mechanical equipment of the ground station (7), such as cable drums (17, 18, 19), waiting and control rooms (14, 15, 22) being disposed on the additional rail (26) so as to be pivotable around the additional axis (26), so that the at least one aerostatic buoyancy body (1) anchored to the receiving device (21) on the tower (20) and at least to the mooring cable (5), together with the pivotable parts of the ground station (7),can be swung away from any side winds.

5. A system according to claim 4, wherein sensors are disposed in the neighborhood of the circular-sector additional rail (26) and measure the extent to which the pivotable parts of the ground station (7) have swung out and communicate the result to the computer, and the computer actuates motors which rotate the first ground station (7) on the first rail (9) around the first axis (8) sufficiently for the aerostatic buoyancy body (1) and the pivotable parts of the base station (7) to be again to windward.

6. A system according to claim 4, wherein each transport cable (3, 4) is with a respective cabin (10 or 11), in the ground station (7) there are two cable drums (17, 18) for each transport cable (3, 4), and both ends of each transport cable (3, 4) in the ground station (7) can be wound on to or unwound from a cable drum (17, 18) and extend around a respective pulley (70, 71) in the gondola (2), and the two pulleys in the gondola are coupled by suitable means so that the two cabins (10, 11) move in opposite directions at the same speed.

7. A system according to claim 6, wherein the traction motors for the transport cables (3, 4) are provided in the gondola (2) and the drive motors for the respective two cable drums (17, 18) in the base station (7) only control the speeds of the transport cables (3, 4) at the correct value when incoming and outgoing.

8. A system according to claim 6, wherein the traction motors for the transport cables (3, 4) are in the ground station (7) and coincide with the drive motors for the respective two cable drums (17, 18).

9. A system according to claim 8, wherein the cabins (10, 11)

internally comprise a downwardly widening funnel-shaped shaft (59) having a wall (57) which extends through the entire height of the cabins (10, 11) and its opening angle is determined by the inclination of the cables when in closed-loop operation, the cabins are supported by a universal suspension (55) which in turn is secured to a sleeve (54) which can be clamped to the transport cable (3 or 4), and the universal suspension (55) is disposed at the top end of the shaft (59) and the transport cable (3, 4) extends through the shaft (59), the possible endless pendulum movement of the cabins is damped by at least one shock-absorber (49), and the at least one shock-absorber (49) acts between the sleeve (54) and the wall (57) of the shaft (59), and the cabins are covered at the top b a hood (50) and at the bottom by a floor cap (51).

10. A system according to claim 6, wherein the cabins (80) have an aerodynamic shape with an approximately horseshoe-shaped ground plan which divides the windward end of the cabins (50) into two portions, the cabin comprises a holder (82) which holds the cabin (80) and is in turn held by a universal suspension (55) which is secured to a sleeve (54) which can be clamped to the endless cable (81), and the sleeve (54) can be opened both in the ground station (7) and in the gondola (2) in order to release the cable (81), the universal suspension (55) is disposed on the holder (82) and the cable (81) extends between the two portions of the cabin (80), the means for separating the cabins (80) from the cable (81) and reconnecting them thereto comprise the sleeve (54) which is longitudinally divided, openable by folding and when in the closed state can be secured by a locking means (86), the possible pendulum motion of the cabins is damped by at least one shock-absorber (49) and the at least one shock-absorber (49) operates between the sleeve (54) and the supporting ports of the cabin (80), and the cabin is covered at the top by a hood (50) and at the bottom by a floor cap (51).

11. A system according to claim 10, wherein the pointed ends, facing away from the wind, of the aerodynamically shaped cabins (10, 11, 80) have a vertical stabilising fin (65) which is pivotable around a substantially horizontal axis (66) so that the fin (65) swings downward when rising and upward when descending, thus allowing for the combined wind vector made up of the horizontal wind and the relative wind.

12. A system according to claim 6, wherein the gondola (2) comprises a clinometer (38) which measures the horizontal position of the gondola (2), the extent of deviation there from if applicable, and transmits the results to the computer, and hydraulic cylinders (39) are provided and operate between the frame (36) and the gondola (2) and can position the gondola (2) horizontally under computer control.

13. A system according to claim 4, wherein the transport cables (3, 4) are combined to form a single rotating endless cable (81) which runs in the gondola (2) on a guide pulley, is guided over the two cable drums (17, 18) for drive purposes in the ground station (7), and any unused lengths of the endless cable (81) made up of the transport cables (3, 4) runs through a cable storage device, and the endless cable (81) bears more than two cabins (80).

14. A system according to claim 13, wherein the cabins (80) on the endless cable (81) comprise means for separating them from the couple (81) both in the gondola (2) and in the ground station (7) and for subsequently reconnecting them to the cable (81).

15. A system according to claim 13, wherein the traction motors for the endless rotating cable (81) made up of the transport cables (3, 4) are provided in the gondola (2), and the drive motors for the two respective cable drums (17, 18) in the ground station (7) only set the speeds of the transport cables (3, 4) at the correct incoming and outgoing value.

16. A system according to claim 13, wherein the traction motors for the endless rotating cable (81) made up of the transport cables (3, 4) are provided in the ground station and coincide with the drive motors for the two respective cable drums (17, 18).

17. A system according to claim 13, wherein the cabins (10, 11, 80) comprise containers (53) which contain parachutes and associated release devices, dynamometers are provided in the suspension device and release the parachutes in the event of a substantial power loss, and the cabins (10, 11, 80) carry shock-absorbing components which are covered by the floor cap (51) and additionally absorb the impact of the cabins (10, 11, 80) against the ground when descending under the parachutes.

18. A system according to claim 3, wherein the round station (7) is disposed on a floating member, floats in water and is anchored by a rope to the bottom of the water, it comprises and additional drum (19) for the mooring cable (5), equipped with a drive motor for releasing the aerostatic buoyancy body (1) or drawing it in against the net buoyancy forces, it comprises waiting rooms (14, 15) for departing and arriving passengers and control rooms (22) for the computer system for controls and drives and the engineering staff, it supports a tower (2) so disposed as to be substantially to windward of the ground station (7) whereas all cables (3, 4, 5) are to leeward, and the tower (20) bears a device (21) for receiving the nose of the aerostatic buoyancy body (1).

19. A system according to claim 1, further comprising at least one aerostatic buoyancy body (1) having photovoltaic cells mounted thereon.

20. A system according to claim 1, wherein the area of the photovoltaic cells is made sufficient for the gondola (2) and all electric loads to be self-sufficient in energy at least by day.

21. A system according to claim 1, wherein the at least one aerostatic buoyancy body (1) bears a helicopter landing platform (46).

22. A system according to claim 1, wherein the gondola (2) carries a number of container-like components (42) containing parachutes and associated release devices, at least one dynamometer is provided on the horizontal shaft (32) on which the gondola (2) is suspended and communicates its measurements to the computer in the gondola, in the event of substantial power loss the at least one dynamometer, for the benefit of the computer, interprets this fact as a sudden and substantial loss of buoyancy and thereupon releases the parachutes, and the gondola (2) carries shock-absorbing elements under its floor so as additionally to absorb the impact of the gondola (2) on the ground when descending under the parachutes.

23. A system according to claim 22, wherein the shock-absorbing components are devices similar to airbags.

24. A system according to claim 23, wherein the shock-absorbing components additionally comprise pneumatic shock-absorbing members (68) secured to the ends of foldable legs (67) which are connected by a cable (67).

25. A system according to claim 22, wherein the shock-absorbing elements comprise honeycomb structures.

26. A system according to claim 1, wherein the mooring cable (5) bears a number of beacons (13) which are illuminated at least at night and equipped with radar transponders.

* * * * *

UNITED STATES PATENT AND TRADEMARK OFFICE
CERTIFICATE OF CORRECTION

PATENT NO. : 6,224,015 B1
DATED : May 1, 2001
INVENTOR(S) : Reinhard

It is certified that error appears in the above-identified patent and that said Letters Patent is hereby corrected as shown below:

Column 9,
Line 24, replace "onto" with -- on to --

Column 11,
Line 23, replace "there from" with -- therefrom --

Column 12,
Line 4, replace "round" with -- ground --
Line 40, replace "of substantial" with -- of a substantial --

Signed and Sealed this

Sixteenth Day of April, 2002

Attest:

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO. : 6,224,015 B1
DATED : May 1, 2001
INVENTOR(S) : Andreas Reinhard

It is certified that error appears in the above-identified patent and that said Letters Patent is hereby corrected as shown below:

Column 3,
Line 7, please delete "rotting" and replace with -- rotating --.

Column 8,
Line 41, please delete "base" and replace with -- ground --.

Column 9,
Lines 53 and 54, delete "base" and replace with -- ground --.

Column 10,
Line 9, please delete "first" prior to "ground".
Lines 11 and 28, delete "base" and replace with -- ground --.
Line 52, please delete "b" and replace with -- by --.

Signed and Sealed this

Fourth Day of May, 2004

JON W. DUDAS
*Acting Director of the United States Patent and Trademark Office*